Dec. 7, 1954    J. A. COMPTON    2,696,172
PRESSURE LOADED PUMP
Filed Dec. 24, 1952

Inventor:
James A. Compton
By: Joseph R. Dwyer
Atty.

United States Patent Office 2,696,172
Patented Dec. 7, 1954

2,696,172

PRESSURE LOADED PUMP

James A. Compton, South Euclid, Ohio, assignor to Borg-Warner Corporation, Chicago, Ill., a corporation of Illinois Application December 24, 1952, Serial No. 327,793

13 Claims. (Cl. 103—126)

This invention relates to a gear pump and more particularly to a gear pump of the type employing pressure loaded bushings, such pumps sometimes being referred to as pressure loaded pumps.

In a pressure loaded gear pump of the type including one set of axially movable, pressure loadable bushings, a part of the discharge pressure generated by the pump is communicated to the rear or motive pressure surface of the axially movable bushings to urge the bushings into sealing relationship with their associated gears. As described in United States Patent No. 2,420,622 to Lauck et al., by carefully selecting the relative size of the forward surfaces and the rear or motive surfaces of the bushings, it is possible to control within very close limits the actual sealing pressure established during operation of the pump. Gear pumps, so constructed, are capable of delivering fluid at extremely high pressure with considerable volume.

It has been found in practice, in pressure loaded pumps of the type described, that the tendency of seizure of the bearing bushings, that is, the flanged portion thereof, with respect to the journals of the gears received in bores of the bushings, has caused a reduction in the overall efficiency of these pumps. It can readily be seen that the radially outer portions of the flanges of the bearing bushings will normally tend to be cooler than the remainder or radially inner portions of the flanges because the radially outer portions are exposed to a large amount of cool liquid. The cool liquid includes that liquid which is carried by the gear teeth pockets during pumping operation, as well as that high pressure liquid circulating through the motive pressure chambers adjacent the rear or motive surfaces of the bushings. Whereas the radially inner portions of the flanges are exposed only to that liquid which is forced radially inwardly towards the relief recesses formed in either the forward surfaces of the bushings or in the gear side faces; these relief recesses being formed herein according to the teachings of the aforementioned Lauck et al. Patent No. 2,420,622. Thus, the bearing bushing flange, found to be cooler on the radially outer portions and hotter on the radially inner portions thereof, expand radially inwardly tending to press inwardly causing seizure of the journals. This situation is aggravated by the inability of the heat at the radially inner portions to be conducted readily outwardly in the flanges. Consequently, one solution to this problem of the tendency of bearing seizure has been to provide a means for allowing expansion radially inwardly of the bearing bushing flange.

Obviously, the large metal mass of the flanges involved also contributes determentally to this situation and, in some instances, the mass of these flanges has been reduced by providing grooves or recesses in the rear or motive pressure surfaces thereof which, in addition to providing a lesser mass, provide for more surface area exposed to the circulation of liquid in the motive pressure chambers at the rear surfaces of the flanges of the bushings. It is apparent that in flanged bushings of the lesser mass, the heat generated by the radially inner portions of the flanges can be conducted to the outer portions more readily and dissipated thereat.

However, in pressure loaded pumps where there has been a reduction in the large metal mass concentrated at the bearing bushing flange, by the provision of the grooves or recesses in the motive pressure surfaces, difficulty has been encountered in maintaining the O-ring seals in their proper position.

One solution to this latter problem has been to provide an integral step or enlargement on the external tubular part of the bushing between the pump housing and the rear or motive pressure responsive surfaces, large enough to maintain the seal in its proper position. However, this solution is inadequate because it increases the cost of manufacture to provide a step on the external surface of the tubular part of the bushing and because it has been found desirable to maintain an unstepped, smooth cylindrical external surface on the tubular part or barrel of the bushing.

Accordingly, one object of the present invention is to provide a means whereby the tendency of bearing seizure, found during operation of the pump, can be substantially reduced.

A further object of the present invention is to provide a means whereby the tendency of bearing seizure can be substantially reduced by allowing suitable radially inward expansion of the flange through a provision for an extension of the relief recesses, normally found in the forward surfaces of the pressure loadable bearing bushings radially inwardly of the roots of the gear teeth in pumps of this type, to a depth which is at least equal to or slightly exceeds the thickness of the flange where the flange has not been recessed in its motive pressure surface, or to a depth at least equal to or slightly exceeding the thickness of the web portion of the flange where this flange has been provided with a recess or groove in its motive pressure surface to reduce the metal mass concentrated in the flange; the web portion being defined as that portion of the flange remaining between the forward or gear engaging surface of the flange and the bottom wall of the recess.

Another object of the present invention is to provide a means for simplifying the manufacture of pressure loaded pumps by providing an insert or sleeve in the motive pressure chamber of the pump which surrounds the external surface of the tubular part of the bushing and is of sufficient width to properly position the O-ring seal.

A still further object of the present invention is to provide a more efficient pressure loaded pump by providing efficient bearing cooling through operation of the relief recesses in the forward surfaces of the bushings and by reducing the large metal mass of the bushings.

In accordance with one embodiment of this invention, the rear or motive pressure responsive surface of each pressure responsive bushing, i. e., the flanged portion thereof, is grooved or recessed a depth such that the large metal mass concentrated in the flange is reduced and the annular relief recess in the forward surfaces of each bushing, radially inwardly of the roots of the gear teeth, is extended to a depth at least equal to or slightly exceeding the thickness of the web portion of the flange as defined by the aforementioned groove or recess in the rear or motive pressure responsive surface. This substantially reduces the tendency for bearing seizure and provides for more efficient cooling. In this embodiment, an annular sleeve surrounding the external surface of the tubular part or barrel of each pressure responsive bushing is disposed within the motive pressure chamber thereof, partly in the aforementioned recess or groove in the rear or motive pressure surface, and partly within another bore or step within the pump housing to position the O-ring seal in this last-mentioned housing bore or step. It has been found in practice that by properly determining the axial width of this sleeve, the movement of the axially movable bushings, during operation of the pump, in no way interferes with the proper positioning of this O-ring seal.

In accordance with a second embodiment of this invention, wherein the flanged portion of each pressure responsive bushing of the pressure loaded type intermeshing gear has not been recessed in its motive pressure responsive surface, the annular relief recess in the forward surface of the bushing, located radially inwardly of the roots of the gear teeth, is extended to a depth at least equal to or slightly exceeding the width of the flange to reduce the tendency of bearing seizure and to provide for more efficient cooling.

Other objects, features and advantages of the present invention will be apparent from the following detailed description taken in conjunction with the drawings wherein.

Figure 1:
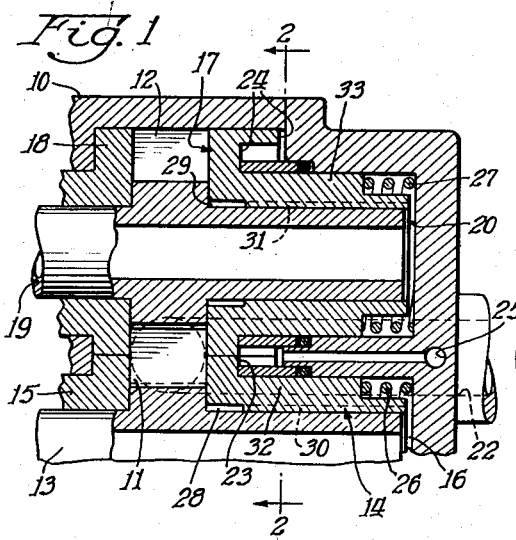
Fig. 1 is a fragmentary, axial, sectional view of a pressure loaded type intermeshing gear pump constructed in accordance with one embodiment of the invention.

Referring to the drawings, numeral 10 denotes a suitably chambered pump housing in which are rotatably mounted a driven gear 11 and an intermeshing driving gear 12. Driven gear 11 is supported on a shaft 13 journalled on its right side through a pressure responsive, axially movable, bushing 14 and on its left side through a fixed body bushing 15. The gear 11 and associated bushings 14 and 15 are arranged in a first chamber 16 formed in the pump housing 10 with sufficient clearance between the right end of bushing 14 and the adjacent wall of the housing to permit axial movement of the bushing 14. Similarly, the driving gear 12 has disposed on its right side a pressure responsive, axially movable, flanged bushing 17 and on its left side a fixed, flanged body bushing 18. Driving shaft 19, upon which gear 12 is mounted, is journalled through the bushings 17 and 18, and may be suitably connected to any driving means (not shown). The gear 12 and associated bushings 17 and 18 are located in a second chamber 20 formed in the housing adjacent and parallel to chamber 16. Sufficient clearance is provided between the right end of the bushing 17 and the adjacent end wall of the housing to permit axial movement of the bushing 17.

Figure 2:
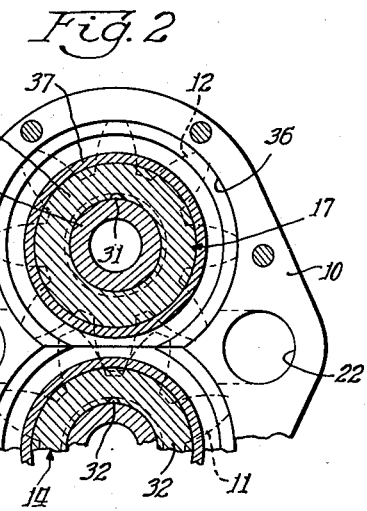
Fig. 2 is a cross sectional view taken substantially along line 2—2 of Fig. 1.

As shown in Fig. 2, the housing has an inlet port or conduit 21 formed on its left side and an outlet port or conduit 22 formed on its right side. Pressure generated by the gears is communicated from the outlet or discharge side of the pump to the motive pressure responsive surfaces 23 and 24 of the axially movable bushings 14 and 17 through a passage 25 communicating with the discharge conduit 22. It is to be understood that this passage 25, as shown in Fig. 1 as formed through the housing 10, is more or less of a schematic character and that, in the usual pressure loaded pumps of the type to which this invention is directed, the discharge pressure is communicated to the motive surfaces of the bushings through an axially extending passage provided between the peripheries of the flanged portions of the bushings adjacent the discharge side of the pump at their point of convergence, as taught in the aforementioned Lauck et al. Patent No. 2,420,622. For the sake of clarity, however, this passage is shown herein as merely a passage in the housing.

To provide an initial sealing relationship between the bushings and the gear side faces, coiled compression springs 26 and 27 are disposed within the rights ends of the chambers 16 and 20, respectively, so as to seat against the terminal ends of the parallel tubular portions of the bushings 14 and 17 to urge the forward surfaces of these bushings into engagement with the gear side faces.

In the usual pressure loaded pump constructed in accordance with the teachings of the aforementioned Lauck et al. Patent No. 2,420,622, relief recesses of annular configuration are formed in the radially inner portions of the forward or gear engaging surface of the pressure loaded bushings, or in the gear side faces, and are placed in communication with a pressure lower than discharge pressure generated by the pump through the usual clearance between the gear journals and the bushing bores or by specific grooves or channels extending axially of the inner cylindrical surface of the tubular part or bore of the bushing. These annular recesses control the effective pressure area of the pressure loaded bushings, the area or size of these relief recesses being determined in any particular pump so as to control the effective pressure area of the flanged bushings in such a manner that axial forces resulting from the pressure generated by the pump acting against the gear side face engaging surfaces of the bushings 14 and 17 tending to produce axial movement of the bushings away from the gear side faces are effectively controlled and overcome by the oppositely directed loading forces communicated to the rear surfaces of the bushings, which latter axial forces are made to slightly exceed the first mentioned axial forces and thereby maintain proper sealing engagement.

As hereinabove mentioned, it is a purpose of the present invention to reduce the tendency of seizure of the bushings with respect to the bearing bores thereof and the journals of the gears, which tendency is caused by radial inward expansion due to heat during operation of the pump. As hereinbefore mentioned, the radially outer portion of the flanges of the bearing bushings will normally tend to be cooler than the remainder or radially inner portions of the flange because the radially outer portions are exposed to a large amount of cool liquid. This cool liquid includes that carried by the gear teeth pockets as well as the high pressure liquid circulating through the motive chambers of the pump. The radially inner portions of the flanges are exposed only to the liquid which is forced radially inwardly towards the relief recess either in the forward surfaces of the bushings or in the gear side faces. It can be seen further that this tendency of bearing seizure is aggravated by the size of the metal mass concentrated in the bearing flange. Consequently, it is proposed that this reduction in the tendency for seizure be accomplished by extending the annular relief recess, normally found in the forward surfaces of the bearing bushing radially inwardly of the gear teeth, to a depth at least equal to or slightly exceeding the flange width. In the case of the bushings that have been grooved or recessed in their motive pressure responsive surfaces to reduce the metal mass concentrated at the flange and to provide for more surface area exposed to cooling liquid circulating through the motive pressure chambers, it has been proposed to extend the annular relief recesses formed in the forward surfaces of these bushings radially inwardly of the gear teeth to a depth equal to or slightly exceeding the thickness of the web portion of the flange formed by this recess or groove; the web portion being defined by the bottom wall of the recess in the flange, i. e., the web portion is that portion of the flange between the forward or gear engaging surface and the bottom wall of the recess remaining after the recess has been formed. In this latter case, the manufacturing difficulty encountered in forming a step on the external surface of the tubular part or barrel of the housing to position the O-ring seal has been overcome by a sleeve inserted in the motive pressure chamber thereof. This sleeve cooperates with the groove in the rear or motive surface of the bushings and a step or enlargement in the housing and properly positions the O-ring seal during axial movement of the pressure loaded bushings.

Figure 3:
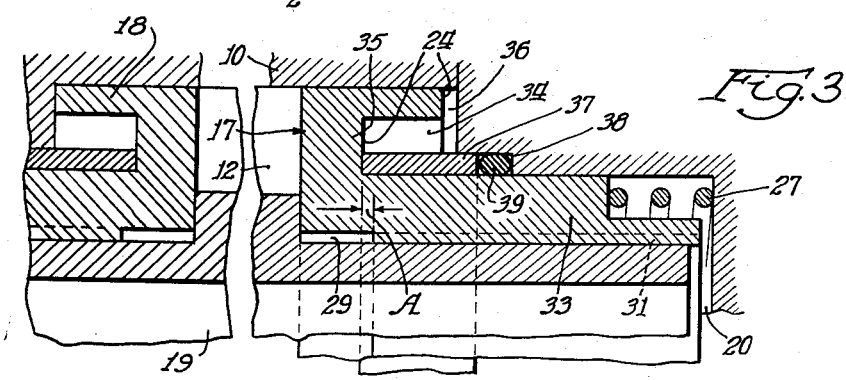
Fig. 3 is an enlarged, fragmentary, sectional view showing to advantage the bushing construction employed in the first embodiment of this invention.

Particularly, in the embodiment shown in Figs. 1 and 3, the axially movable pressure loaded bushings 14 and 17 have formed in the forward surfaces thereof annular relief recesses 28 and 29. Axially extending passages or grooves 30 and 31 are formed in the bores of the tubular portions 32 and 33 of the bushings adjacent the gear shafts 13 and 19 to place these relief recesses 28 and 29 in communication with the right end extensions of the chambers or bores 16 and 20. These right end portions or extensions communicate with the inlet port of the pump and are normally maintained at intermediate pressure, i. e., a pressure less than discharge but greater than inlet pressure.

As more clearly shown in Fig. 3, the flanged portion of the axially movable bushing 17 has formed therein an annular relief recess or groove 34, the radially inner wall of which comprises in effect an extension of smooth, cylindrical outer surface of the tubular portion of the bushing. The end wall of recess 34 defines one side of the web portion 35 in the bushing flange. As is apparent, this relief recess or groove substantially reduces the metal mass on the flange. In order to maintain the O-ring seal in its proper position, and to facilitate manufacture and because it has been found desirable to maintain an unstepped, smooth, outer cylindrical surface on the tubular part of the bushing, there is disposed within the motive pressure chamber 36, defined by the bushing 17 and the housing 10, a sleeve 37 of relatively flat cross sectional dimension which extends into the recess or groove 34 of the bushing 17 on the one side, and into a bore or step 38 in the housing 10 on the other side to properly position the O-ring seal 39 about the tubular portions 33 of the bushing and housing 10. It is apparent that by properly selecting the width of the sleeve 37 to fit the recess 34 and the bore 38, the O-ring seal can be properly positioned, regardless of any movement of the flanged, axially movable, pressure loaded bushing 17.

To overcome the aforementioned bearing seizure during operation of the pump, the annular relief recess 29 radially inwardly of the roots of the gear teeth on the forward surface of the bushings is extended a distance at least equal to or slightly beyond the thickness of the web portion 35 as clearly shown in exaggerated proportion by the distance marked A in Fig. 3. It is obvious that the thickness of the web portion of any particular pump will determine the depth to which these recesses extend because these recesses are extended in proportion to the flange or the web portion thereof. It can be seen that because of the increase or extension in the depth of the annular recesses 29 radially inner expansion due to heating of the radially inner portions of the flanges of the bushings is compensated for and that because of the reduction in the metal mass of the flange of the bushing, the heated generated in the radial inner portion of the flange can be more readily conducted outwardly and dissipated in the outer portion of the flange. This will provide for more efficient cooling of the bearing bushings with a resultant gain in overall pumping efficiency.

While these features of this invention concerning the web portion 35 and the depth of the recess 29 have been illustrated in connection with the flanged bushing 17, the bushing 14, in like manner, has the same features associated therewith.

Figure 4:
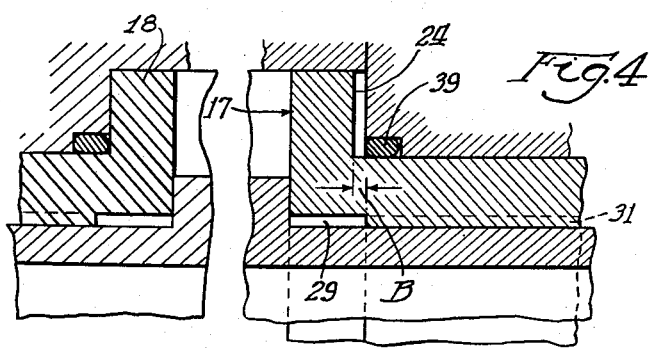
Fig. 4 is an enlarged fragmentary sectional view showing to advantage the bushing construction employed in the second embodiment of this invention.

In the embodiment shown in Fig. 4 the same reference numerals are provided as used in connection with the embodiment shown in Fig. 3 with the exception of the reference B. In this embodiment, where the flanged bushing does not have a rear annular recess or groove, such as recess or groove 34 in the embodiment shown in Fig. 3, the O-ring seal can be positioned along the tubular portion of the bushing 17, and the forward annular relief recess 29 radially inwardly of the roots of the gear teeth, is extended to a depth at least equal to or slightly beyond the flange thickness as shown in exaggerated proportions marked B in this figure. Obviously, as in the case of the other embodiment, the depth to which these relief recesses are extended is proportioned in any particular pump by the thickness of the flange.

It is to be understood also that while the O-ring seal 39 and the extension of the annular recess 29 to a distance at least equal to or slightly exceeding the thickness of the flange, has been illustrated in connection with the bushing 17 in Fig. 4, the bushing 14 in like manner has the same feature associated therewith.

While the above features of this invention relating to reducing the tendency of bearing seizure, during operation of the pressure loaded pump, have been directed to the axially movable, pressure loadable bushing, it will be appreciated that the fixed or body bushings in a pressure loaded pump of this type likewise will have a tendency toward seizure of the journals adjacent the flanged portions of these body bushings. Therefore, in a manner similar to the pressure loaded bushings, the bores of the fixed or body bushings 15 and 18, as disclosed in Fig. 1 and more clearly shown in the left-hand portion of Fig. 4, may be recessed at their gear engaging surfaces radially inwardly of the roots of the gear teeth to a depth at least equal to or slightly exceeding the thickness of the flange. In those pressure loaded pumps having fixed or body bushings recessed in the rear surface thereof to provide for more efficient cooling and lighter weight, in a manner similar to the embodiment shown in Fig. 3, the recess would extend to a distance at least equal to or slightly exceeding the thickness of the web portions thereof.

It will be readily apparent that in either of these above mentioned cases there will be some cooling liquid in the rear portions of the fixed or body bushings due to leakage normally found during normal operation of the pump, and, therefore, the flanged portions of the bushings will be subjected to a slight flow of liquid causing more efficient cooling. In this manner, the tendency of bearing seizure caused by expansion radially inwardly adjacent the flanged portions of the bushing has been substantially reduced.

Where herein the various parts of this invention have been referred to as being located in the right or left position, it will be understood that this is done solely for the purpose of facilitating description and that such reference relate only to the relative position of the parts as shown in the accompanying drawings.

While this invention has been described in its exemplary forms or embodiments, it will be understood to persons skilled in the art, after understanding the improvements, that various changes and modifications may be made therein without departing from the spirit or scope thereof.

What is claimed is:

1. In a pressure loaded rotary liquid displacement device of the type, including a housing, rotary liquid displacement means received within said housing; means defining an axially adjustable bearing bushing having a radially extending flange formed with a pressure responsive surface for effecting a liquid seal engagement with said rotary liquid displacement means, said bushing being formed with a reduced axial tubular extension received in a corresponding reduced bore in said housing, and a relief recess formed radially inwardly of the outer periphery of the liquid displacement means on the radially inner surface of said bushing adjacent the liquid displacement means, said relief recess extending axially of the bushing a distance approximately equal to the thickness of the flange whereby radially inward expansion and more efficient cooling is provided thus reducing seizure of said bearing bushing during operation of said pump.

2. In a pressure loaded rotary liquid displacement device of the type, including a housing, rotary liquid displacement means received within said housing; means defining an axially adjustable bearing bushing having a radially extending flange formed with a pressure responsive surface for effecting a liquid seal engagement with said rotary liquid displacement means, said bushing being formed with a reduced axial tubular extension received in a corresponding reduced bore in said housing, and a relief recess formed radially inwardly of the outer periphery of the liquid displacement means on the radially inner surface of said bushing adjacent the liquid displacement means, said relief recess extending axially of the bushing a distance approximate to the thickness of the flange whereby radially inward expansion and more efficient cooling is provided thus reducing seizure of said bearing bushing.

3. In a pressure loaded rotary liquid displacement device of the type, including a housing, rotary liquid displacement means received within said housing; means defining an axially adjustable bearing bushing having a radially extending flange formed with a pressure responsive surface facing away from said liquid displacement means for effecting a liquid seal engagement with said rotary liquid displacement means, said bushing being formed with a reduced axial tubular extension received in a corresponding reduced bore in said housing, and a groove formed in the pressure responsive surface of the flange of said bushing to define a web, a relief recess formed radially inwardly of the outer periphery of the liquid displacement means on the radially inner surface of said bushing adjacent the liquid displacement means, said relief recess extending axially of the bushing a distance approximately equal to the thickness of the web of the flange whereby radially inward expansion and more efficient cooling is provided thus reducing seizure of said bearing bushing during operation of said pump.

4. A pressure loaded rotary displacement device according to claim 3 wherein the bore has an enlargement formed therein and wherein a sleeve is placed in the groove which defines the web and extends into the enlargement of said reduced bore, an O-ring seal positioned in said enlargement of the reduced bore in said housing, said sleeve properly positioning said O-ring seal during operation of the pump.

5. In a liquid pressure generating pump of the type including a housing containing intermeshing gears, axially movable bushings and fixed bushings, said gears being journalled in said bushings, each of said bushings being radially outwardly flanged with a forward surface engageable with the side faces of said gears, and each of said bushings having axially extending tubular portions of smaller diameter than said flanges, said axially movable bushings being subject to discharge pressure to maintain sealing engagement with said gear side faces during operation of the pump, and means for reducing bearing seizure by allowing radially inward expansion of the bushings and providing more efficient cooling, said means comprising annular relief recesses formed adjacent the gear journals, the depth of which extend axially approximately equal to the thickness of said flanges.

6. In a liquid pressure generating pump of the type including a housing containing intermeshing gears, axially movable bushings and fixed bushings, each of said bushings being radially outwardly flanged with a forward surface thereof engageable with the side faces of said gears, and each having axially extending tubular portions of smaller diameter than said flanges, the rear faces of said axially movable bushings opposite to said gear engaging surfaces being subject to discharge pressure to maintain sealing engagement with the gear side faces during operation of the pump, and means for reducing bearing seizure of the pump by allowing radially inward expansion of the bushings and providing more efficient cooling, said means comprising web portions defined by grooves formed in the rear faces of said axially movable bushing to reduce the weight of said flanges and to provide more surface area exposed for cooling by liquid, and annular relief recesses formed radially inwardly of the roots of the gear teeth on the radially inner forward surface of the bushings and extending axially a distance approximately equal to the thickness of the web portions.

7. In a liquid pressure generating pump of the type including a housing containing intermeshing gears, axially movable bushings and fixed bushings, said gears being journalled in said bushings, each of said bushings being radially outwardly flanged with a forward surface engageable with the side faces of said gears, and each of said bushings having axially extending tubular portions of smaller diameter than said flanges, said axially movable bushings being subject to discharge pressure to maintain sealing engagement with said gear side faces during operation of the pump, and means for reducing bearing seizure and providing more efficient cooling, said means comprising annular relief recesses radially inwardly of the roots of the gear teeth and adjacent the gear journals on the forward surface of each of said bushings, the depth of which extends axially a distance at least equal to or slightly exceeding the thickness of said flanges.

8. In a liquid pressure generating pump of the type including a housing containing intermeshing gears, axially movable bushings and fixed bushings, each of said bushings being radially outwardly flanged with a forward surface thereof engageable with the side faces of said gears, and each having axially extending tubular portions of smaller diameter than said flanges, the rear faces of said axially movable bushings opposite to said gear engaging surfaces being subject to discharge pressure to maintain sealing engagement with the gear side faces during operation of the pump, and means for reducing bearing seizure of the pump and providing more efficient cooling, said means comprising web portions defined by grooves formed in the rear faces of said axially movable bushings to reduce the weight of said flanges and to provide for more surface area on the rear faces of said bushings exposed to liquid cooling, and annular relief recesses formed on the radially inner forward surface and extending axially of said bushings a distance at least equal to or slightly exceeding the thickness of the web portions.

9. In a pressure loaded rotary liquid displacement device of the type, including a housing, rotary liquid displacement means received within said housing; means defining an axially adjustable bearing bushing having a radially extending flange formed with a pressure responsive surface for effecting a liquid seal engagement with said rotary liquid displacement, said bushing being further formed with a tubular extension received in a corresponding reduced bore in said housing, said tubular portion having an uninterrupted external surface, an O-ring seal member positioned between said tubular extension and said housing bore in sealing contact with said tubular extension, and a relief recess formed radially inwardly of the outer periphery of the liquid displacement means on the radially inner surface of said bushing adjacent the liquid displacement means, said arrangement being characterized by the formation of a recess in the pressure responsive surface of said flange and defining a web portion therein, and a sleeve located in the recess in the pressure responsive surface of said flange and between said O-ring seal for suitably holding said O-ring seal in proper position, and means for directing pressure liquid to said pressure responsive surface.

10. A pressure loaded rotary liquid displacement device as claimed in claim 9 being further characterized by the feature that said relief recess formed radially inwardly of the outer periphery of said liquid displacement means on the surface of said bushing adjacent said liquid displacement means being extended axially a distance approximately equal to the thickness of the web portion of said flange to reduce seizure of said bearing bushings by allowing radially inward expansion thereof.

11. In a liquid pressure generating pump of the type including a housing containing intermeshing gears, axially movable bushings and fixed bushings, each of said bushings being radially outwardly flanged with a forward surface engageable with the side faces of said gears, and each of said bushings having axially extending tubular portions of smaller diameter than said flanges, said axially movable bushings being subject to discharge pressure on the rear surface of said flange to maintain sealing engagement with said gear side faces during operation of the pump, and means for reducing bearing seizure and providing more efficient cooling, said means comprising annular relief recesses radially inwardly of the roots of the gear teeth on the radially inner forward surface of each of said axially movable bushings, the depth of which extends axially a distance at least equal to or slightly exceeding the thickness of said flanges.

12. In a liquid pressure generating pump of the type including a housing containing intermeshing gears, axially movable bushings and fixed bushings, each of said bushings being radially outwardly flanged with a forward surface engageable with the side faces of said gears, and each of said bushings having axially extending tubular portions of smaller diameter than said flanges, said axially movable bushings being subject to discharge pressure to maintain sealing engagement with said gear side faces during operation of the pump, and means for reducing bearing seizure and providing more efficient cooling, said means comprising annular relief recesses radially inwardly of the roots of the gear teeth on the radially inner forward surface of each of said fixed bushings, the depth of which extends axially a distance at least equal to or slightly exceeding the thickness of said flanges.

13. In a liquid pressure generating pump of the type including a housing containing intermeshing gears, axially movable bushings and fixed bushings, each of said bushings being radially outwardly flanged with a forward surface thereof engageable with the side faces of said gears, and each having axially extending tubular portions of smaller diameter than said flanges, the rear faces of said axially movable bushings being subject to discharge pressure to maintain sealing engagement with the gear side faces during operation of the pump, and means for reducing bearing seizure of the pump and providing more efficient cooling, said means comprising web portions defined by grooves formed in the rear faces of said fixed bushings to reduce the weight of said flanges and to provide for more surface area on the rear faces of said bushings exposed to liquid cooling, and annular relief recesses formed on the radially inner surfaces and extending axially of said bushings a distance at least equal to or slightly exceeding the thickness of the web portions.

References Cited in the file of this patent

UNITED STATES PATENTS

| Number | Name | Date |
|---|---|---|
| 1,709,580 | Jensen | Apr. 16, 1929 |
| 2,098,652 | Buckbee | Nov. 9, 1937 |
| 2,420,622 | Roth et al. | May 13, 1947 |
| 2,487,721 | Minshall | Nov. 8, 1949 |
| 2,487,732 | Schanzlin | Nov. 8, 1949 |